United States Patent [19]

Heikkinen

[11] Patent Number: 4,936,362

[45] Date of Patent: Jun. 26, 1990

[54] FIREWOOD CLEAN OUT APPARATUS

[75] Inventor: Norman L. Heikkinen, Prentice, Wis.

[73] Assignee: Multitek, Inc., Prentice, Wis.

[21] Appl. No.: 388,594

[22] Filed: Aug. 2, 1989

[51] Int. Cl.[5] .......................... B65G 19/18; B27L 7/00

[52] U.S. Cl. ...................................... 144/366; 15/3.11; 144/3 R; 144/193 A; 198/735

[58] Field of Search ................... 198/735; 15/94, 3.11; 144/3 K, 193 R, 193 A, 366

[56] References Cited

U.S. PATENT DOCUMENTS 4,281,697 8/1981 Heikkinen et al. ................. 144/3 K 4,505,376 3/1985 Bynum ................................ 198/735

*Primary Examiner*—W. Donald Bray

*Attorney, Agent, or Firm*—Jacobson & Johnson

[57] ABSTRACT

A firewood cleaning apparatus for separating debris from firewood with the cleaning apparatus having a slatted bed for joltingly catching firewood to dislodge debris from the firewood and a conveyor chain for pushing the firewood along the slatted bed to separate and remove additional debris from the firewood prior to bundling the firewood for delivery to a customer.

11 Claims, 2 Drawing Sheets

FIREWOOD CLEAN OUT APPARATUS

FIELD OF THE INVENTION

This invention relates generally to firewood clean out apparatus for separating debris from firewood and, more specifically, to a clean out conveyor for use with a wood processing machine that permits the debris and the firewood to be separated from the firewood before the processed firewood is packaged for delivery.

BACKGROUND OF THE INVENTION

The use of firewood as an alternate fuel has resulted in the development of wood processing devices for measuring, cutting, and splitting firewood logs into firewood, which typically has a length of about sixteen inches. In addition to cutting the firewood logs into the proper length the firewood is longitudinally split into smaller sections. One of the problems with the processing of firewood logs is the debris that gets mixed in with the firewood as a result of the conversion of the firewood logs into firewood (firewood is referred herein as logs that are cut and split into lengths and sizes that can be put directly into a stove or fireplace, usually about sixteen inches long). Generally, the cutting and splitting of the firewood logs produces not only firewood but debris such as loose bark, dirt, sawdust, saw chips, and wood splinters. Since firewood is taken into the home to be burned the presence of debris with the wood creates an unpleasant mess for the consumer. The present invention comprises an apparatus for separating the firewood from the debris so that the wood processing operator can feed the firewood and debris directly from a log cutting and splitting device into the clean out conveyor to separate and remove the unwanted debris from the firewood before the firewood is bundled for shipping to the customer.

DESCRIPTION OF THE PRIOR ART

The U.S. Pat. No. 4,281,697 shows a typical firewood system for cutting and splitting a firewood log into firewood.

SUMMARY OF THE INVENTION

Briefly, the present invention comprises an apparatus and method for separating debris from firewood with the separator comprising a rigid slatted bed having parallel spaced bars for joltingly catching firewood and rotating endless chains having cross bars that push the firewood along the slatted bed to permit additional debris to fall through the openings located in the slatted bed so that the debris can be separated from the firewood prior to discharging the firewood from the conveyor.

DESCRIPTION OF THE PREFERRED EMBODIMENT

Figure 1:
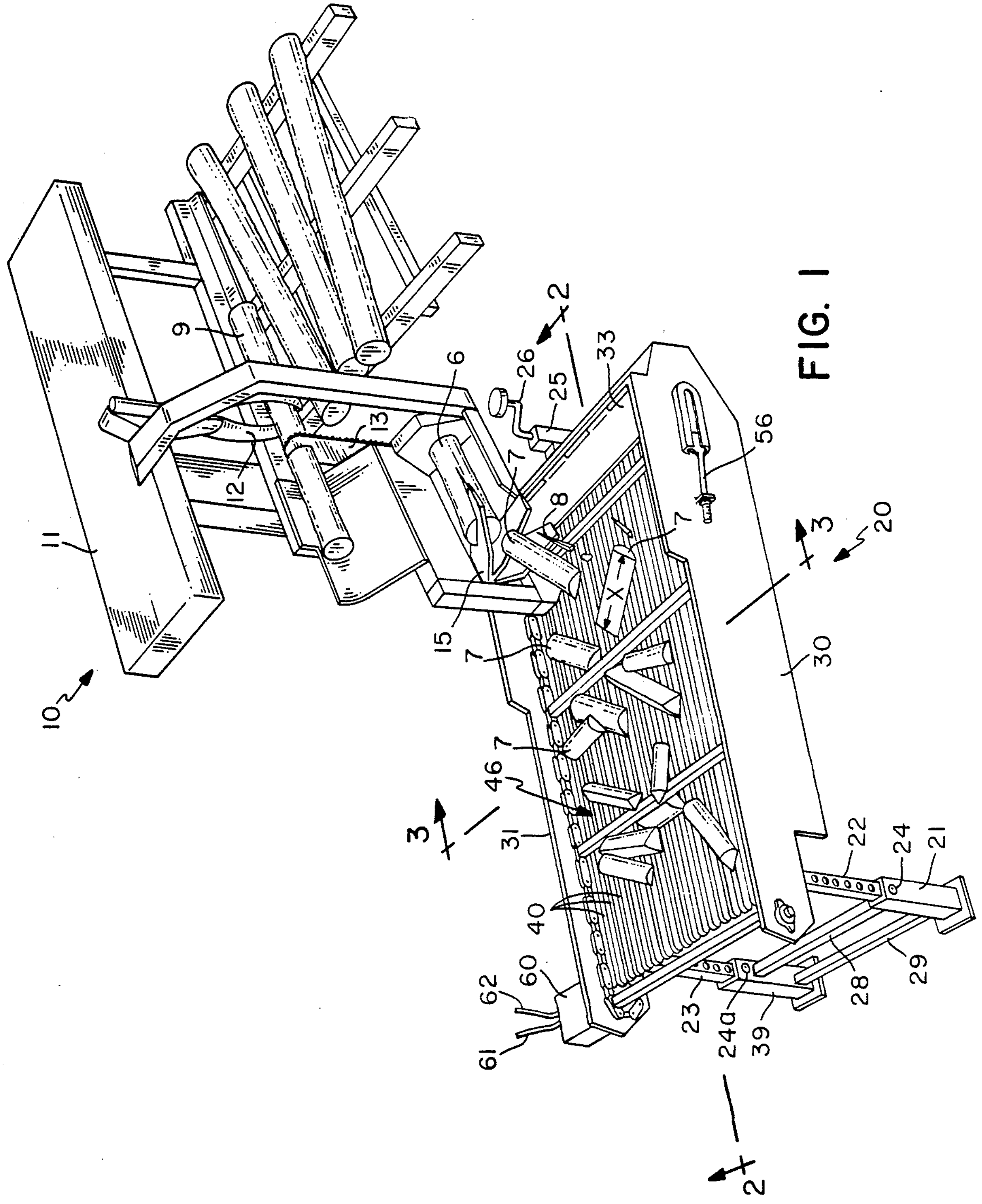
FIG. 1 a perspective view of a wood processing apparatus for cutting and splitting firewood logs and my firewood clean out conveyor for separating the debris from the firewood.

Referring to FIG. 1 reference numeral 10 general identifies a firewood processing system for, measuring, cutting and splitting firewood. Such a system is shown in the U.S. Pat. No. 4,281,697. Briefly, such a firewood processing system includes a firewood log station 11 for holding firewood logs which are typically 8 to 10 feet or longer, a grapple hook 12 for moving a firewood log 9 into position to be cut and for holding a firewood log 9 in place during the cutting process. A pivotal chain saw 13 cuts firewood log 9 to the proper length. After cutting the firewood log to the proper length the cut firewood 6 is longitudinally split into multiple sections by a splitting wedge 15. In general the firewood processor converts firewood logs having lengths of 8 to 10 feet or longer into firewood that typically has a length of approximately 16 inches. The larger diameter firewood is split lengthwise into smaller sections by a splitter 15 mounted on the wood processor.

Figure 2:
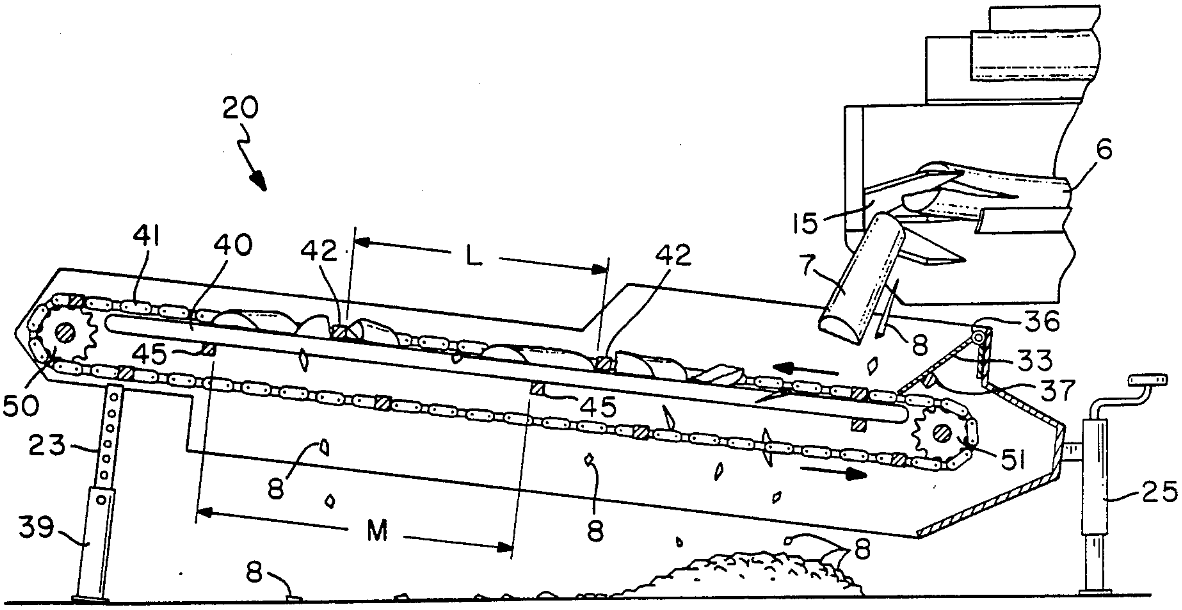
FIG. 2 is a cross sectional view of my clean out conveyor taken along lines 2—2 of FIG. 1.
Figure 3:
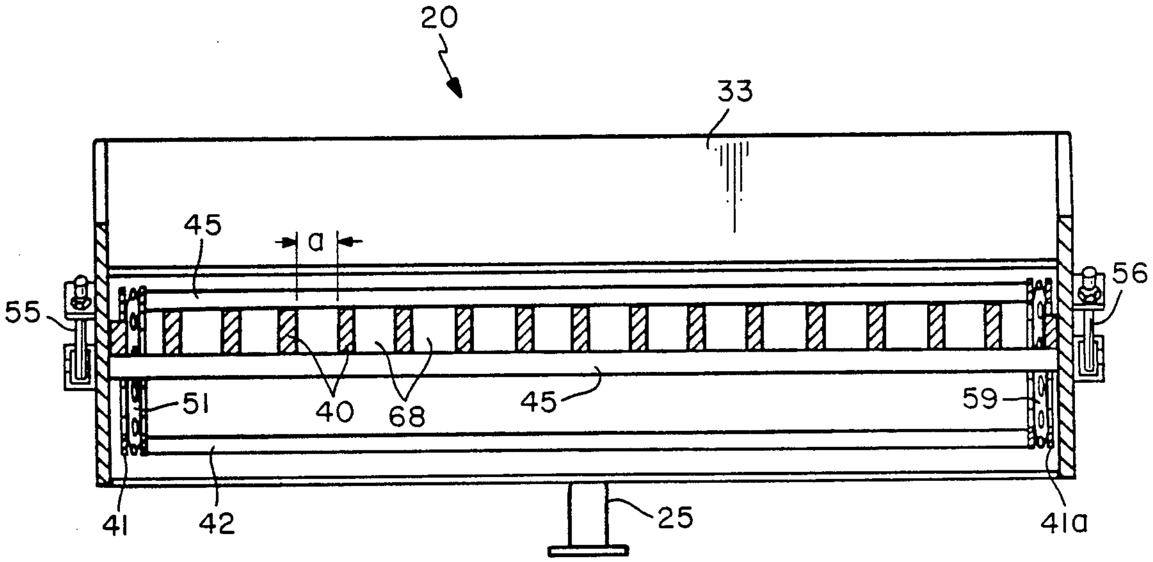
FIG. 3 is a end sectional view of my firewood clean out conveyor taken along lines 3—3 of FIG. 1.

FIGS. 1, 2, and 3 show the present invention of a firewood clean out apparatus identified by reference numeral 20. Firewood clean out apparatus or conveyor 20 comprises a housing having a side 30, a side 31, and a pivotal back flap guide 33. Sides 30 and 31 prevent firewood from falling off the sides of my conveyor and back flap guide 33 prevents firewood from falling off the end of conveyor 20. FIG. 2 shows flap guide 33 includes a hinge 36 and a weight 37 that causes the longitudinal end of flap guide 33 to normally rest on top of rotating chain 41 located on one side of conveyor 20 and an identical rotating chain located on the opposite side of conveyor 20. As chain 41 and its opposite counterpart rotate counterclockwise flap guide 33 moves up and down over the chain thus directly firewood 7 forward and onto a slotted bed 46 formed by a plurality of spaced apart members or slats 40. In addition flap guide 33 also prevents firewood from falling off the lower end of bed 46.

Supporting the front of conveyor 20 is an adjustable front stand having a front leg 21 and a front post 22 that telescopically slides within leg 21. A pin 24 extends through leg 21 and post 22 to permit the user to position the front of conveyor 20 at the proper height. A first cross bar 28 and a second cross bar 29 connect leg 21 to a leg 39 and a post 23. Post 23 also telescopically slides within leg 39 to permit the user pin leg 39 to post 23 at the proper height through a pin *24a*. Thus the front stand permits the user to set the front of conveyor at the proper height for a particular operation.

Located on the rear of conveyor 20 is a rotatable hand jack 25 with a crank handle 26 that can be rotated to raise or lower the rear of conveyor 20. The use of adjustable support on both the front and rear of my conveyor permits my conveyor to be adjusted for both the terrain and the type of wood processor used with my invention.

Clean out conveyor 20 includes a bed 46 formed of a plurality of parallel spaced bars 40 and endless rotating chain 41 and its counterpart *41a* that are driven by a hydraulic motor 60. Hydraulic motor 60 connects to a source of hydraulic power (not shown) through a first hydraulic line 61 and a second hydraulic line 62. The purpose of using a hydraulic motor for rotating chain 41 and its counterpart chain *41a* is that it permits clean out conveyor 20 to be connected and operated by existing sources of hydraulic power that are available in most wood processing systems. Thus the present invention can become an integral part of an existing wood processing system.

FIG. 2 illustrates how split firewood 7 and debris fall into and are separated in my clean out conveyor 20. In operation firewood 7 falls from splitter 15 onto slats 40 that make up a slatted catching bed 46 for firewood 7. The slats 40, as shown in FIG. 3, are spaced apart in a parallel arrangement to form a plurality of parallel spaced openings 68 for debris to fall through but not firewood. When the split firewood drops onto slats 40 firewood 7 receives an initial jolt as it drops onto rigid slats 40. The jolt received by firewood 7 shakes loose debris such as sawdust, chips, and other materials that may be on the firewood. That is, the bed 46 is formed of rigid slats 40 that have sufficient strength so as to catch the split firewood without flexing to thereby provide a nonsoft landing that results in a jolt to firewood 7. The initial jolt received by firewood 7 as it hits bed 46 separates debris clinging to the firewood from the firewood. Typically, I prefer to have the split firewood fall a minimum of about a foot so that firewood log 7 receives a sufficient jolt to knock loose debris clinging to the firewood. While the distance the firewood falls to receive a jolt may vary with the type of firewood, the operating conditions, and the type of cutting and splitting operation the distance the firewood falls should be sufficiently high so that the initial jolt causes debris clinging to the firewood to be shaken loose from the firewood. This initial jolt removes and separates a substantial portion of the debris from firewood 7. FIG. 2 illustrates that a pile of debris comprised of chips 8 has accumulated under the region where firewood drops onto my rigid slatted catching bed 46.

After firewood 7 falls on to my slatted support bed 46 I continue to separate and remove debris through the coaction of the slatted support bed 46 and my endless rotating chains 41 and 41*a* that are connected together by a plurality of spaced cross slats or cross bars 42. The counterclockwise rotating endless chain 41 with cross bars 42 pushes firewood 7 along the top of slatted bed 46. As firewood is pushed along bed 46 the firewood 7 may tumble and move about on the top of the bed. As it does so, debris 8 falls through the openings 48 located in slatted bed 46. The firewood 7 which is substantially larger than openings 68 is carried to the end of the conveyor where it drops onto a bundling area or another conveyor that loads firewood 7 into a truck, box or the like. During the process of pushing split firewood along the slatted bed the openings in bed 46 permit additional debris such as splinters or wood chips to fall through the parallel spaced openings 68 in conveyor 20. Thus my firewood clean out conveyor comprises a two step process where the debris is first shaken off by jolting the firewood as it falls onto a rigid bed and than by pushing the firewood over bed with it's parallel openings where additional debris can be separated from the firewood.

A reference to FIG. 1 shows that the firewood 7 is designated as having a length x. Typically, for most firewood the length x is about 16 inches although the length of the firewood can be varied to suit the particular users application. My slatted bed 46 has parallel spaced bars 40 that are preferable made of ½ inch by 1½ inch hot rolled steel with a spacing therebetween denoted by distance a. For most woods the spacing "a" between adjacent slats is a minimum of about 1 inch. A minimum spacing of about 1 inch allows debris to fall through the slatted bed while preventing the split firewood from wedging in or falling through the slatted bed 46.

In order to prevent debris such as wood chips from getting caught in the cross slats 42 the distance between slats which is denoted as "L" is substantially longer than the length of the firewood 7. For example, with firewood having a length of about 16 inches I use a cross slat chain spacing "L" of about 26 inches. While more or less spacing could be used I have found that in most instances such a spacing provides sufficient room to push firewood 7 along the top of bed 46 and for debris 8 to fall through slatted bed 46 without getting hung up. Similarly, in order to insure that the debris 8 does not get caught on the bottom of the support for slats 40 I space the cross support slats 45 a distance "M" apart which is on the order of the dimension L. While the actual dimensions may vary with my bed the parallel spacing of the slats 40 forming the support bed and the length of the openings formed by slats 40 should have sufficient width and length so that debris, which may be as long as the cut firewood, has sufficient opportunity to fall through the slatted bed 46.

In the present conveyor the length of my slotted bed is ten feet, however, it is envisioned that bed 46 could be lengthened or shortened as desired. That is, the length of bed 46 should be sufficiently long so that debris is given an opportunity to fall through the slotted openings. I have found that in most instance with hardwoods and during normal processing operations that a slotted bed of about six feet is sufficient length to separate remaining debris from the firewood.

I claim:

1. An apparatus for separating and removing debris from firewood comprising:

a firewood processor having means for delivering firewood that has been split;

a bed for dropping firewood of a predetermined length thereon, said bed located below said means and having sufficient rigidity so as to permit firewood to be jolting dropped on said bed to thereby dislodge debris that may be on said firewood, said bed having a plurality of parallel spaced members forming a plurality of openings therebetween with said members spaced sufficiently far apart so that said plurality of openings permit debris to fall through said plurality of openings while preventing firewood from falling through said plurality of openings;

a rotatable conveyor chain, said rotatable conveyor chain having a plurality of spaced apart bars extending transversely across said bed to permit firewood to be pushed along said bed by said bars on said rotatable conveyor chain to thereby permit additional debris to be separated and removed from the firewood as the firewood is pushed along said bed and;

means for rotating said rotatable conveyor chain to push the firewood along said bed so that the firewood can be delivered to a discharge area in a condition free of debris while the debris is permitted to fall through said plurality of openings in said bed.

2. The apparatus of claim 1 wherein said parallel spaced members are spaced a minimum of one inch apart to permit debris to fall between said parallel spaced members.

3. The apparatus of claim 2 wherein said spaced apart bars on said conveyor chain are spaced a predetermined distance from each other which is longer than the length of the firewood dropped onto said bed to permit the firewood to be pushed along the bed while debris falls through said openings in said bed.

4. The apparatus of claim 3 wherein including side shields and back shields on said apparatus for directing firewood onto said bed.

5. The apparatus of claim 4 wherein said bed is at least six feet long.

6. The apparatus of claim 5 wherein the length of said plurality of openings formed by said parallel spaced members is greater than the length of firewood dropped onto said bed.

7. A firewood clean out apparatus for separating and removing debris from firewood comprising;

a processor having a splitter for letting split firewood fall onto the bed of a firewood clean out apparatus;

a bed for joltingly catching firewood containing debris to permit the jolt to dislodge debris from the firewood, said bed having openings therein to permit dislodged debris to fall through said bed; and means for moving the firewood along said bed to permit additional debris to be separated from the firewood as the firewood is moved along said bed so that the firewood and the debris on the firewood are discharged from different regions on said bed.

8. The method of separating firewood from debris comprising the steps of:

dropping firewood containing debris onto a member from a sufficient height to jolt the firewood and dislodge debris from the firewood; and than moving the firewood over a slotted bed having a discharge region to permit debris to be separated from the firewood as the firewood is delivered to the discharge region.

9. The method of claim 8 wherein the firewood is moved over elongated rectangular shaped openings in the bed to permit the debris to fall through the openings while the firewood passes over the bed.

10. The method of claim 9 wherein firewood is elevated upward as the firewood is moved along the bed.

11. The method of claim 10 wherein an endless conveyor moves firewood along the bed to permit debris to fall through the bed.

* * * * *